Figure 1:
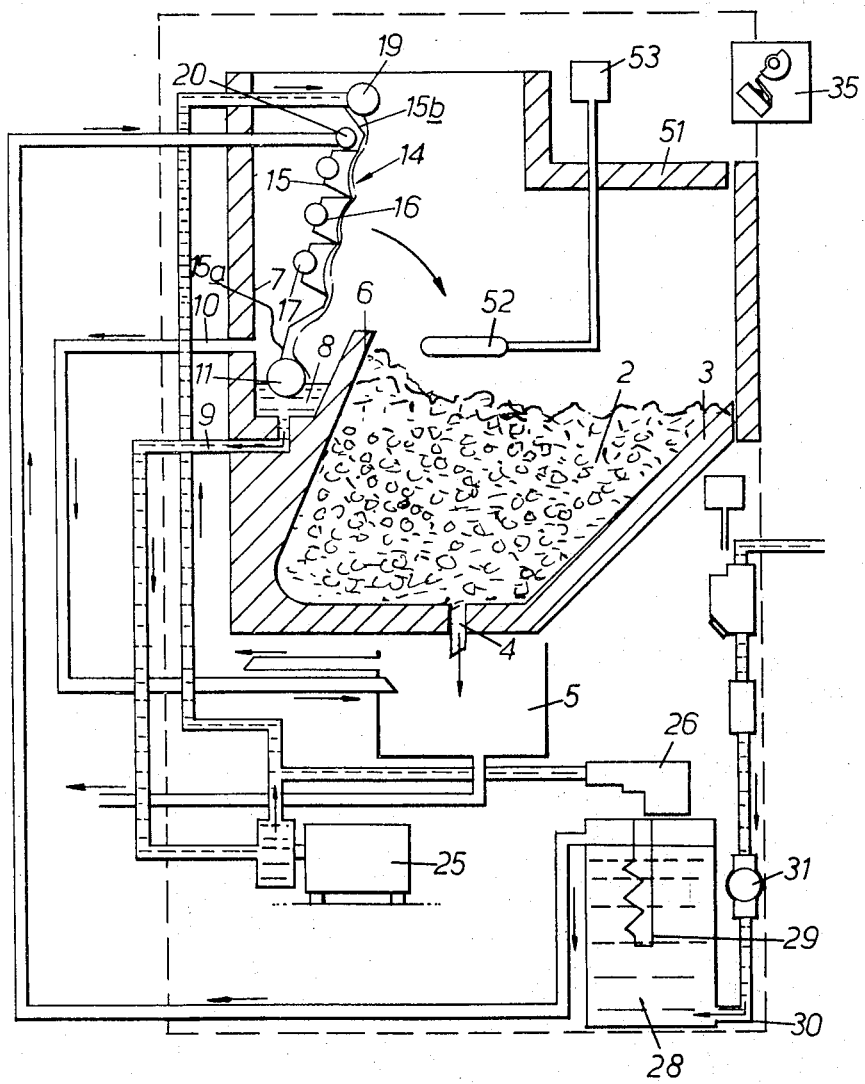

United States Patent [19]

Tester

[11] 3,812,686
[45] May 28, 1974

[54] ICE MAKING APPARATUS

[75] Inventor: Colin Alfred Tester, Maidstone, England

[73] Assignee: Winget Limited, Rochester, Kent, England

[22] Filed: Jan. 12, 1973

[21] Appl. No.: 322,910

[52] U.S. Cl.................. 62/180, 62/188, 62/233, 62/348
[51] Int. Cl. ............................................ F25c 1/12
[58] Field of Search ............. 62/348, 180, 179, 188, 62/349, 233; 137/409

[56] References Cited
UNITED STATES PATENTS

| | | | |
|---|---|---|---|
| 2,763,993 | 9/1956 | Bayston | 62/180 X |
| 3,163,993 | 1/1965 | Johnson | 62/348 X |

*Primary Examiner*—William E. Wayner
*Attorney, Agent, or Firm*—Kemon, Palmer & Estabrook

[57] ABSTRACT

An ice-making machine by which batches of pieces of ice are made repeatedly automatically relies on the flow of water over a freezer surface to make the ice. The water is pumped from a trough that initally contains a predetermined volume of water, and water not retained by the freezer surface flows back into the trough. When the level in the trough has fallen to a predetermined value, a level responsive device puts the pump temorarily out of action and operates means for causing the ice to fall from the freezer device. The trough is automatically replenished so that it again contains the predetermined volume of water and the cycle is repeated.

8 Claims, 3 Drawing Figures

PATENTED MAY 28 1974 3,812,686

SHEET 1 OF 3

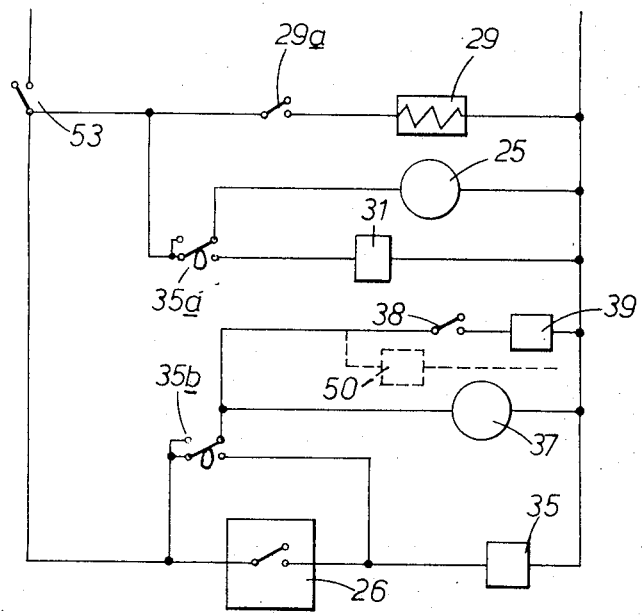
FIG. 3.
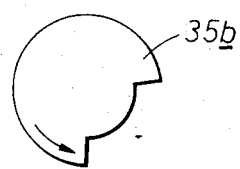
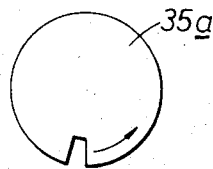

ICE MAKING APPARATUS

BACKGROUND OF THE INVENTION

There is a need for ice-making machines which will enable heaps of ice to be readily available in restaurants, bars and so on. For economy of space it is desirable that the apparatus should be small, but operate repeatedly to produce ice in sufficient quantities. The operation should be preferably automatic, reliable, and entail minimal wastage of water.

This invention relates to ice making apparatus and is especially applicable to apparatus for making pieces of ice of a size suitable for use in chilling drinks. Apparatus in which the invention may be embodied is suitable for use in a public house although it is expected that embodiments of the invention will be used in other places, such as hospitals, where a supply of ice is needed. When the apparatus is to be used in a public house, it may be of such a size that it fits conveniently beneath the bar. Larger models may also be made.

According to the present invention, there is provided ice making apparatus in which ice is formed on a freezing device from the cooling of a current of water on the freezing device, wherein a trough is arranged to receive water flowing from the freezing device, a pump is provided to recirculate water from the trough to the freezing device, releasing means associated with the freezing device is operable to effect release from the freezing device of ice formed on it, means is associated with the trough whereby with the pump operating at a predetermined rate, the connection between the trough and the pump will close upon the level of the water in the trough falling to a pre-determined level, and means responsive to a pressure change resulting from the closure of the connection, the response effecting operation of the releasing means and replenishment of the trough so that it contains a predetermined charge of water.

Figure 2:
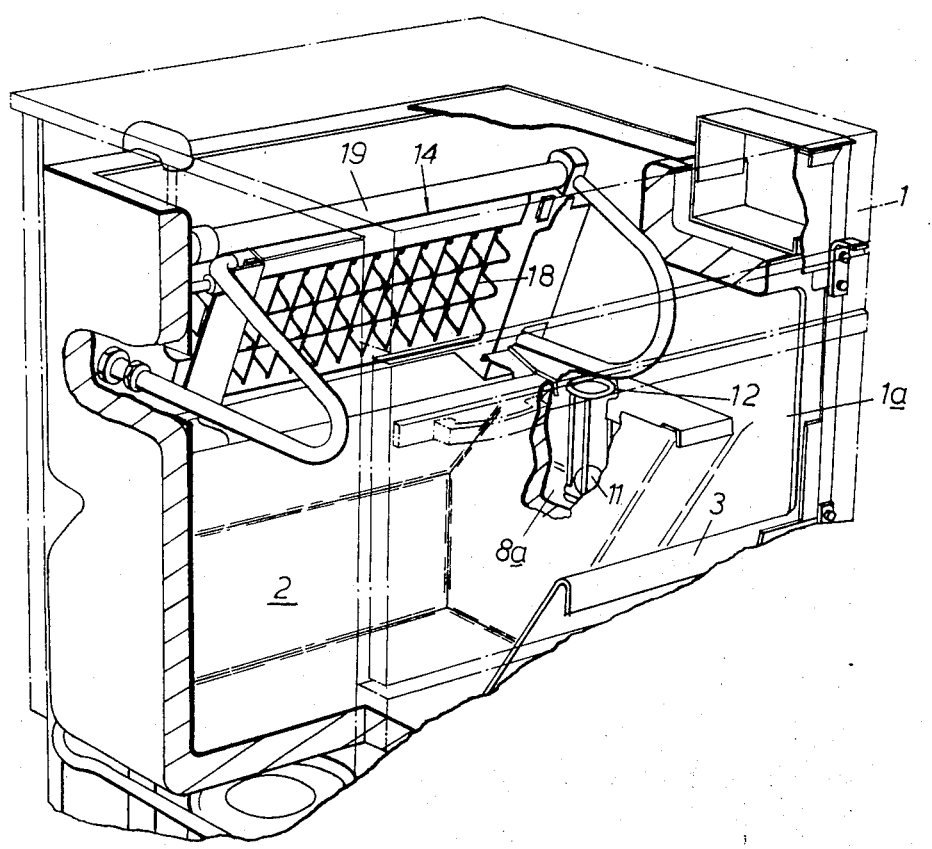

By way of example, an embodiment of the invention will now be described with reference to the accompanying drawings in which FIG. 1 shows diagrammatically apparatus for making pieces of ice;

FIG. 2 is part of a perspective view, partly cut away, of the apparatus illustrated in FIG. 1; and FIG. 3 is a diagram illustrating the control circuit by which the apparatus illustrated in FIGS. 1 and 2 is able to produce pieces of ice repeatedly automatically.

The apparatus shown in the drawing is especially useful to caterers and is of such a size as to stand conveniently on the floor beneath a bar of a public house.

The apparatus includes a rectangular casing, indicated generally at 1, and including at its front a horizontally hinged door 1a. Opening the door gives access to a bin 2 in which the pieces of ice are collected as they are made. The front wall 3 of the bin slopes upwardly towards the door and any liquid appearing in the bottom of the bin 2 will escape through the drain 4 into the drain tank 5.

Between the rear wall 6 of the bin and the rear wall 7 of the casing there is a part 8 of a trough, the trough including an extension 8a that lies along one side of the bin. The floor of the trough slopes towards an outlet pipe 9 that leads from the extension 8a. An overflow pipe 10, discharging into the drain tank 5, leads from the part 8 of the trough and thus determines the maximum volume of water that the trough can hold.

For a purpose that will be described later, a ball 11 (shown diagrammatically in FIG. 1 and in situ in FIG. 2), captive in a cage 12, floats above the inlet to the pipe 9. The location of the inlet to the pipe 9 is such that the ball 11 is accessible when the door 1a has been opened.

Extending along and above the part 8 of the trough is a freezing device indicated generally at 14. This includes a base member 15 shaped to provide three channels 16 parallel with the part 8. A tube length 17 is incorporated in the base of each channel and the tube lengths 17 are connected in series with each other to form a flow path through which coolant can pass in operation of the apparatus. Portions 18 divide the channels lengthwise into spaces of the size desirable for pieces of ice.

At its lower edge, the base member 15 is provided with a run-off surface 15a leading into the part 8 of the trough. At its upper edge, the base member 15 is provided with a surface 15b. Above, and parallel to, the surface 15b is a distribution header 19 provided with perforations spaced along its length and arranged to discharge on to the surface 15b. On the other side of the surface 15b is a defreezing manifold 20.

The axes of the tube lengths 17 lie in a plane that is inclined to the vertical at about 18° and the contours of the base member 15 and partitions 18 are such that no part of the surface on the downwardly facing side of the member 15 slopes upwardly.

A pump 25, mounted below the bin 2, is arranged to draw water from the trough and deliver it to the header 18. A pressure switch 26 is responsive to the pressure downstream of the pump 25.

A supply tank 28, incorporating a heater 29 that is controlled by a thermostat 29a, is mounted below the bin 2 and is arranged to supply the defreezing manifold 20. To deliver water from the tank 28 to the manifold 20, make-up water is supplied through the duct 30, flow through which is controlled by the solenoid valve 31. Control of the solenoid valve 31 is effected automatically from the pressure switch 26 and the pressure switch 26 (see FIG. 3) is connected in series with a timer 35 which, when started, runs for a predetermined period — of 3 minutes in the particular example illustrated.

The timer includes two cam switches 35a and 35b. By the cam switch 35a, the solenoid valve 31 is in circuit for part of the period of the timer (the duration of the part being indicated by the recess at the periphery of the cam 35a) and the pump 25 is in circuit for the rest. By the cam switch 35b, the compressor 37 and the associated thermostat 38 and fan motor 39 are connected in circuit for the part of the period of the timer indicated by the peripheral recess of cam 35b. The solenoid valve is in circuit during the first part of the period of operation of the timer, the pump operates for the remainder of the period and the compressor 37, and associated equipment, operate during the last part.

To prevent the apparatus from making an excessive amount of ice, a thermostat 52 is disposed above the floor of the bin 2 at a position that indicates an appropriate reserve of ice. When the ice reaches the level of the thermostat 52 it will be affected to hold the mains switch 53 open until the ice level has fallen.

To use the apparatus, the mains switch 53 is closed. Suppose the apparatus to have been switched off previously when the pump 25 was running and outside a timer period, and that there is no water in the apparatus. The pump will start to operate but since the ball 11 will be sealing the inlet of the pipe, the low pressure that will actuate the pressure switch 26 will develop and so the timer will be started. This will open the valve 31 so that water runs into the tank 28 for the period set by the timer. The pump will then run for the remainder of the timer period but, since there is as yet no water in the trough, the ball will remain on the inlet to the pipe 9 and the timer will be set by the pressure switch 26 into operation again as soon as the preceding timer period ends. This procedure will be repeated until the tank 28 has filled and water has been sent from the tank 28 to the manifold 20 to flow over the back of the freezing device 14 into trough. The arrival of water in the trough should cause the ball to float automatically but easy access from the door 1a enables it to be dislodged if it has become stuck.

When water has flowed into the trough, the pump 25 will operate to circulate the water over the front of the freezer device 14. The pressure switch will be in the high pressure condition so that the compressor 37 and associated apparatus will operate to send refrigerant through the tube lengths 17. The effect of the refrigerant will be to freeze on to the freeze device some of the water supplied to it. When the effect of this has been to lower the water level in the trough sufficiently, the ball 11 will close the pipe 9, and cause the pressure switch to actuate the timer. This will initially switch off the compressor 37, admit make-up water to the tank 28 so that warmer water is driven from the tank 28 to the manifold 20. Thence water will flow over the rear of the freezing device into the trough (any excess escaping through the overflow 10). The period of flow through the manifold is determined by the timer and will be stopped after, in the present embodiment, 48 seconds. The flow of water over the rear of the freezer device 14 will loosen the ice that has formed on it and it will fall forwards into the bin 2. The "dead" part of the timer period, when the pump is operating after the end of the flow from the tank 28 and before the restarting of the compressor, enables the pressures at the compressor to come into balance, so that the compressor is more reliable and efficient. After the compressor has come again into operation, the timer will stop, and the pump 25 will continue to circulate water from the trough until the level in the trough has fallen far enough for the ball to close again the pipe 9.

In the preceding description of the operation of the apparatus, it was supposed that the trough was dry. If it contained water, as when the apparatus had been switched off by the thermostat 52, then if switching on caused the pump to operate immediately, water could start to circulate immediately.

In describing the operation of the apparatus, it was supposed that the mains switch was closed outside a timer period. If closing the mains switch operates the timer immediately, the pump will not start immediately if the timer is at a stage for which the valve 31 is open. The pump will, however, start after a delay and the timer period will run to its end.

In a modification of the control apparatus, the pump and compressor switch is such as to put either the pump and compressor or a timer into circuit. Whilst the timer is operative, two cam switches are rotated. The first is connected across the pressure switch 26 and isolates the pressure switch except for the last portion of the timer period. The other controls the solenoid valve 31 and is arranged to hold the solenoid valve 31 open for the portion of the timer period that precedes the ending of the isolation of the pressure switch.

In the apparatus that has been described, a current of water over the freezing device is provided by water dropping on to the top of the freezing device and then running down over the surface on which it freezes. It is envisaged that the current could be provided by spraying water on to the freezing surface.

Instead of the air cooling of the refrigerant by means of the fan motor 29, water cooling may be used. In this case, the motor 39 is replaced by a valve controlling the flow of cooling water and a fan, indicated in broken line at 50, is connected in parallel with this thermostat 38 and water valve.

The bin, trough and walls of the casing above the bin are lined, as indicated at 51, with sprayed deposits of insulating material lined internally with a plastic coating.

We claim:

1. Ice making apparatus in which ice is formed on a freezing device from the cooling of a current of water on the freezing device, wherein a trough is arranged to receive water flowing from the freezing device, a pump is provided to recirculate water from the trough to the freezing device, means is provided for releasing from the freezing device, ice that has been formed on it, means is provided to respond to the level of the water in the trough to close the connection between the trough and the pump when the level of water in the trough has fallen to a pre-determined level, and means is provided to respond to a pressure change resulting from the closure of the connection, the response effecting operation of the releasing means and replenishment of the trough so that it contains a pre-determined charge of water.

2. Apparatus as claimed in claim 1 in which the means for closing the connection between the trough and the pump includes an outlet in the bottom of the trough, a float such that, when the water level in the trough has fallen to the pre-determined level, the float will rest on the outlet.

3. Apparatus as claimed in claim 2 in which means is provided to restrain the float to lie down the outlet.

4. Apparatus as claimed in claim 2 in which means is provided to respond to the pressure in the connection between the trough and the pump, a timing device is arranged to respond to the change in pressure resulting from the float resting on the outlet, the means for releasing ice from the freezer device is connected to the timer device to be set in motion by actuation of the timer device, and maintained in operation for a pre-determined period, and the pump is controlled by the timer device to be kept out of operation whilst the timer device is in operation.

5. Apparatus as claimed in claim 4 in which the pump is connected with means for controlling a refrigerant circuit whereby the freezing device is cooled whilst the pump is in operation.

6. Apparatus as claimed in claim 1 in which the means for releasing ice from the freezing device includes means for which water may be caused to flow over the freezing device to raise its temperature to a value at which the ice is released.

7. Apparatus as claimed in claim 4 in which the trough is provided with an overflow device, and the pre-determined charge of water is the maximum valume of water contained by the trough without overflowing.

8. Apparatus as claimed in claim 1 in which the means for releasing ice from the freezing device includes means from which water may be caused to flow over the freezing device to raise its temperature to a value at which the ice is released, the trough is arranged to receive water that has flowed over the freezing device, and the trough is provided with an overflow device so that any water in the trough that is in excess of the pre-determined charge overflows.

* * * * *